United States Patent [19]

Peterson

[11] Patent Number: 5,739,420

[45] Date of Patent: Apr. 14, 1998

[54] GROUND WATER INFILTRATION DETECTION SYSTEM

[76] Inventor: Roger Peterson, Rte. 1 Box 316, Sweeny, Tex. 77480

[21] Appl. No.: 710,713

[22] Filed: Sep. 18, 1996

[51] Int. Cl.$^6$ .................................................. G01N 3/08
[52] U.S. Cl. ............................... 73/40.5 R; 73/49.1
[58] Field of Search ............... 73/40, 40.5, 40.7, 73/49.1; 358/84

[56] References Cited

U.S. PATENT DOCUMENTS

| | | | |
|---|---|---|---|
| 4,921 | 5/1847 | Stutzman | 73/40.7 X |
| 3,505,513 | 4/1970 | Fowler et al. | 364/551.01 |
| 3,695,094 | 10/1972 | Hulme | 73/40.5 R |
| 3,699,802 | 10/1972 | Hotta et al. | 73/40.5 R |
| 3,739,089 | 6/1973 | Latall. | |
| 3,984,627 | 10/1976 | Galerne | 73/152.54 X |
| 4,306,446 | 12/1981 | Fukuda | 73/40.5 R |
| 4,308,746 | 1/1982 | Covington | 73/40.5 R |
| 4,651,558 | 3/1987 | Martin et al. | 73/40.5 R |
| 4,651,559 | 3/1987 | Horigome et al. | 73/40.5 R |
| 4,727,748 | 3/1988 | Horigome et al. | 73/40.5 R |
| 4,819,053 | 4/1989 | Halavais | 342/353 |
| 4,913,558 | 4/1990 | Wettervik et al. | 73/40.5 R |
| 5,149,453 | 9/1992 | Parekh | 73/40.7 X |
| 5,421,192 | 6/1995 | Henry | 73/40.7 |

FOREIGN PATENT DOCUMENTS

| | | | |
|---|---|---|---|
| 55-74436 | 6/1980 | Japan | 73/40.5 R |
| 59-58300 | 4/1984 | Japan | 73/40.5 R |
| 88-150650/22 | 4/1988 | Japan | 73/40.5 R |
| 3150498 | 6/1991 | Japan | 73/49.1 |

*Primary Examiner*—George M. Dombroske
*Assistant Examiner*—Paul D. Amrozowicz
*Attorney, Agent, or Firm*—Gunn & Associates P.C.

[57] ABSTRACT

This invention is directed toward the detection fluid infiltration into an underground pipe system, and more particularly is directed toward the qualitative and quantitative detection of liquid leaks into, and out of, underground sewer systems. The invention is particularly suited for detecting the infiltration of ground water into sewer systems such that the leaks can be precisely located as a precursor to time and cost efficient repairs. Fluid properties are measured with a probe at station locations which are preferably manholes. Any leaks in the system are first determined to a geographic location spanning two adjacent manholes. The locations of the leaks are further define to a very high geographic resolution by floating the probe from the upstream manhole toward the downstream manhole while continuously recording fluid property measurements at the surface of the earth. Results are preferably presented in the form of a survey map.

28 Claims, 3 Drawing Sheets

GROUND WATER INFILTRATION DETECTION SYSTEM

BACKGROUND OF THE INVENTION

This invention is directed toward the detection of fluid infiltration into an underground pipe system, and more particularly is directed toward the qualitative and quantitative detection of the leakage of liquid into, or out of, underground sewer systems. The invention is particularly suitable for the detection of infiltration of ground water into an underground sewer system.

The efficient disposal of sewage in a manner safe to humans and to the environment as become an international priority. Underground sewage disposal pipeline networks in the United States and in other countries are aging. Some sewer pipes in older cities in the United States have been in uses for decades and, in some cases, for almost a century. As pipes age, and as the ground surrounding these pipes shifts with time, the pipes tend to leak. Such leakage allows sewage to seep from the pipe into the surrounding earth. Although this presents some health and environmental problems, the earth acts somewhat as a filter for particulate material within the liquid. Only the liquid phase can migrate a substantial distance from the leak. Migration of the liquid phase is further obstructed if the surrounding earth material is relatively impermeable such as a clay material. Leaking sewer pipes also allow the infiltration of ground water into sewer pipes which, in many cases, presents an even more significant problem as will be discussed below.

In many areas of the world, the ground water level is quite close to the surface. As an example, the ground water level along the Gulf Coast of the United States often lies only a few feet beneath the surface of the earth. As a further example, the ground water level in Houston, Tex., is often found as close as five to six feet to the surface of the earth. Sewage system pipeline networks are often buried ten feet or more below ground level, and in many municipalities such as Houston, the majority of the sewage pipeline system is located below the ground water level.

The disposal of voluminous quantities of liquid sewage is a major expense for all municipalities. The infiltration of ground water into the sewage system increases further the effort and expense required for proper sewage disposal. Sewer pipes made of vitreous clay or concrete are quite common, and are also quite susceptible to leakage over time as surrounding ground shifts and possibly crushes sections of this type of pipe, thereby causing leaks. If the crushed section is below the ground water level, the infiltration of this ground water through these leaks can double or even triple or quadruple the amount of liquid flowing within the pipe. This, in turn, doubles, triples, or even quadruples the amount of sewage that must be treated and disposed. Such an increase in sewage volume has significant economic, health and environmental impact for the responsible municipality.

The ideal solution to the problem of aging, leaking sewage pipe is the replacement of the entire sewage pipeline system with more durable pipe such as modern plastic compounds such as polyvinyl chloride (PVC). Although ideal, this solution is usually not economically feasible, even though the existing pipe may be concrete and may be below the ground water level.

An alternate abatement solution for a leaking sewer pipe is either replacement, or installing a liner wherein only the leaking section of pipe is replaced. Using this solution, the accurate location of ground water infiltration into the sewage system is of prime importance. Accurate location of the leak, in general, tends to minimize the amount of pipe that must be replaced and, in turn, minimizes the cost and inconvenience involved in the replacement. As an example, if a leak can be located in a pipeline with an accuracy of plus or minus twenty feet, then the repair procedure would typically involve close inspection (after cleaning) with remote TV cameras. If, however, the leak can be located in the pipeline with an accuracy of plus or minus three feet, the same repair procedure would involve the replacement of only six feet of pipe. Or, the repair can be done with no TV camera inspection. In the latter example, digging costs and material costs would be greatly reduced, as would inconvenience to the public.

Quantification of the leak is also very useful. If, as an example, several leaks are located within a given sewage pipe network, it is usually desirable to prioritize the leaks in terms of the volume flow rate of each leakage, and then to repair the largest leaks first.

An object of the present invention is the location of liquid leaks either out of, or into, an underground pipeline network. A further object of the present invention is the quantification, or at least estimation, of the magnitude of liquid leaks out of, or into, an underground pipeline network. A still further object of the invention is to maximize the accuracy of the location of liquid leaks in an underground pipeline network. An even further object of the invention is to maximize the efficiency of data gathering necessary to determine the location, and possibly the magnitude, of liquid leaks within an underground pipeline network. An additional objective of the present invention is the optimization of the accuracy of the measures geographic location of station data acquisition points which are required to obtain the previously mention invention objects. A still additional object of the present invention is to display measured data, the location of leaks, and possibly quantitative or qualitative determinations of the magnitudes of the leaks, in the form of a map which is easily read and interpreted. There are other objects of the present invention which will be come apparent in the following disclosure.

SUMMARY OF THE INVENTION

Leaks in sewer pipes are determined by first measuring one or more properties of the liquids flowing within the sewage lines. The measured properties include total dissolved solids (TDS), conductivity salinity, temperature, and possibly combinations of these properties. The properties are preferably measured using a probe which is initially lowered from the surface of the earth into the sewage stream through access holes commonly known as "manholes". Fluid properties are made at a set of known geographical locations by lowering the probe through a plurality of manholes. These will be referred to as "station" measurements. The manholes might access the same sewage line at different locations along its extent, or might access a plurality of interconnected lines.

For manhole accessing a single sewage line, any change statistically significant change in the measured property between adjacent manhole access points indicates that a leak is occurring somewhere along the pipe between the adjacent manhole access points. As an example, assume that salinity is the measured fluid property. Assume that the measuring probe containing a salinity meter is lowered into a sequence of manholes accessing a single sewer line. The measured salinities are defined as $X_{i,j}$, where the subscript i identifies the sewer line and the subscript j identifies the manhole.

Further assume that the values of $X_{i,j}$, for $j=1, \ldots, n$, fall within a range of $\pm e$, where e represents the statistical and systematic uncertainty of the measurement. At manhole $j=n+1$, the quantity $X_{i,n+1}$ is smaller than the quantities $(X_{i,j}-e)$ where $j=1, \ldots, n$. This indicates that liquid, such as ground water with a salinity significantly less than the salinity of the sewage (namely $X_{i,j}$ where $j=1, \ldots, n$), is infiltrating the sewage flow presumably through a leak in the sewer pipe. Physically, the sewage stream is being diluted by an infusion of "fresher" liquid from outside of the sewer pipe.

As a second example, assume that TDS is the measured fluid property. Assume that the measuring probe containing a TDS meter is lowered into the sequence of manholes accessing the single sewer line. The measured TDS values are again denoted as $X_{i,j}$, where again the subscripts i and j identify the sewer line and specific manhole, respectively. The measured values of $X_{i,j}$, for $j=1, \ldots, n$, fall within a range of $\pm e$, where in this example e represents the statistical and systematic uncertainty of the TDS measurement. At manhole $j=n+1$, the quantity $X_{i,n+1}$ is larger than the quantities $(Xi,j+e)$ for $j=1, \ldots, n$. This indicates that liquid sewage is leaking out of the sewage line. The surrounding earth acts as a filter for the solids, and allows only the liquid phase of the sewage to move away from the leak. The solids collect at or near the leak, and tend to be again dissolved by the flowing sewage stream thereby increasing the TDS reading, $X_{i,n+1}$, obtained when the probe is lowered into manhole $j=n+1$.

As a third example, assume that temperature is the measured fluid property. Assume that the measuring probe containing a temperature gauge is lowered into the sequence of manholes accessing a single sewer line. The quantities $X_{i,j}$ in this example represent liquid temperature measurements. Again assume that the values of $X_{i,j}$, for $j=1, \ldots, n$, fall within a range of $\pm e$, where e here represents the uncertainty of the temperature measurements. At manhole $j=n+1$, the quantity $X_{i,n+1}$ is lower than the quantities $(X_{i,j}-e)$ where $j=1, \ldots, n$. This indicates that liquid, such as ground water, with a temperature which is usually lower than the temperature of the sewage (namely $X_{i,j}$ where $j=1, \ldots, n$), is infiltrating the sewage flow presumably through a leak in the sewer pipe. Physically, the sewage stream is relatively warm in that it contains waste "hot" water used to wash clothes, bath, and the like. The heat tends to be retained by the sewage as it flows within the sewer pipe, especially if the pipe is made of a relatively good insulating material such as concrete. In addition, the earth surrounding the sewer pipe tends to act as an insulator. Therefore, when relatively cool ground water infiltrates a relatively warm sewage stream, the temperature of the composite sewage stream decreases. If the point of infusion is a leak in sewer line i between manhole n and manhole n+1 resulting in temperature measurements such that $X_{i,n+1} < (X_{i,j}-e)$, where $j=1, \ldots, n$.

It is apparent that measures of other fluid parameters can also be used to identify fluid movement into, or out of, a sewer line. There must, however, be a measurable contrast in fluid without and within if infusion through a pipeline flaw is to be detected. In addition, leakage of fluid out of the pipeline must measurably affect the property of the fluid stream remaining within the pipeline. TDS, salinity, temperature and conductivity meters are well known in the art and are widely used in a variety of industries. More specifically, these types of meters or gauges are used in the petroleum industry to measure properties of fluids in well boreholes, and are used widely in the petroleum refining industry to monitor flow streams into and out of various devices in present day refineries. Such meters are also widely used in agriculture and in the food processing industry to monitor everything from the quality of irrigation water to the quality of liquid food products such as milk, syrup, soft drinks and the like.

A fluid stream such as a sewage stream can also be "doped" by adding materials that give the stream measurable properties that change as a function of infiltration of ground water. As an example, salt such as sodium chloride can be added to the sewage "up stream" from the section of sewer line to be monitored for leaks. The salinity of the sewage stream is then measured at or near the point of doping. Any infusion of fresh water down stream from the point of doping will result in salinity measurements lower than the value measured at the point of doping. As a second example, colored dye can be added to the sewage stream up stream from the section of sewer line to be monitored for leaks, and the concentration of the dye is then measured with a colorimeter at or near the point of doping. Any infusion of water downstream from the point of doping will result in colorimeter readings lower than the value measured at the point of doping.

The foregoing examples illustrate the definition of leak locations with a rather coarse "resolution" between station measurements, namely between two identified manholes. Manholes can often be separated by a distance as large as a city block. Using only the station measurement data previously described, the entire city block length of pipe would have to be excavated and replaced, although the leaking section of pipe may be only several feet in length. In order to increase the resolution of the station measurements, additional "continuous" measures of fluid property are made. The probe is first attached to one end of a cable on a reel. The probe is lowered into the manhole immediately up stream from the leak, which was denoted as manhole $j=n$ in the previous examples. Cable is further deployed from the reel such that the probe can be floated within the sewage stream between the manhole J=n and the manhole immediately downstream from the detected leak, which was denoted as manhole J=n+1 in the previous examples. Continuous fluid property measurements are made as the probe floats within the sewage. When the probe floats to the immediate vicinity of the leak, the previously discussed variation in the measured fluid property will be detected, and this information will be telemetered from the probe, preferably by means of one or more electrical conductors within the cable, to the surface for recording, processing and mapping. The pinpoint location the leak is defined as the distance d, measured from the location of manhole J=n, at which the significant change in continuous fluid property measurements occurs which is, in turn, determined by measuring the amount of cable deployed from the reel at the time the change in fluid property is observed. This allows the absolute location of the leak to be determined with a resolution of a few feet thereby greatly reducing the time, expense, and inconvenience associated with leak repair. The continuous probe measurements can be obtained at the time the station manhole measurements are obtained, but it is preferred that these measurements be made after all station measurements have been mapped an analyzed.

The probe can be designed to measure a plurality of fluid properties. As an example, the probe can be designed to measure both the concentration of a particular dye and the salinity of the sewage. That is, the probe incorporates a salinity meter and a colorimeter. Furthermore, the sewage stream is doped with the particular dye upstream from the suspected leaks. If, as an example, the salinity of the water leaking into the sewage system is close to the salinity of the "natural" sewage, a measure of salinity variation alone would not identify the leak. The accompanying colorimeter reading would, however, detect dilution of the dye and would, therefore, be used as the leak identifying sewage property measurement.

Signals from the probe and the cable reel are input into preferably a portable computer for recording and processing. The portable computer is preferably a laptop computer which is ideally suited for portage between manhole openings for field applications. Since the survey of a typical city sewage system involves readings at literally thousands of manhole openings, a plurality of computers can be used by a plurality of work crews to reduce the overall time of the survey. The geographical location of each survey point must be accurately known in order to generated the desired survey maps. Manhole locations could be determined from existing sewage system maps, but this would be an extremely tedious task and very vulnerable to location errors. To avoid this, each laptop computer is connected to a global positioning system (GPS) which communicates with a satellite in geosynchronous orbit by means of an antenna. Such systems are well known in the art and are available commercially. When a station survey measurement $X_{i,j}$ is made, the location of the survey point is automatically determined by the GPS and recorded, along with the corresponding value $X_{i,j}$, in the memory of the laptop computer.

As mentioned previously, it is also desirable to determine the magnitude of the leak, either quantitatively or at least as an estimation. If certain fluid volume flow rates can be determined within the sewage system, the flow rate of the leak can be determined quantitatively as will be discussed in detail in a subsequent section. If such measurements are not possible, which is often the case, good estimates of the flow rate can be made by observing the leak by means of a television (TV) camera mounted on the floating probe. Many options are available. The probe operator can simply observe the damaged pipe area by means of the TV system, and use certain criteria, including experience, to estimate the volume flow rate of the leak. This estimate is recorded in the memory of the laptop computer along with the station fluid property measurements $X_{i,j}$, the geographic location of the corresponding station point and, if appropriate, the amount of cable deployed from the reel. Alternately, the operator can select a single "still" image of the leak, and record this image for use in subsequent estimations of leak volume flow rates. The TV camera transmits signals over an electrical or fiber optic conductor within the cable to the laptop computer for recording.

After completing the entire sewage system survey, data from all field laptop computers are downloaded into a central computer for processing and for the generation of map displays. The map displays preferably include each station reading $X_{i,j}$ plotted at its appropriate geographical location. If the maps indicate a strong possibility of a leak, it is preferable to send a crew back to the suspect location to perform the continuous measurements between manholes. As mentioned previously, the continuous measurements can be made in conjunction with the station measurements. To do this, however, the field crew must at least tentatively analyze the station data to determine if a situation exists such that $X_{i,n+1}$ is, in fact, significantly different from $X_{i,n}$. Often this analysis is best made by experts after initially processing all station data from all of the field crews. Regardless of when obtained, the station data maps are updated by pinpointing the geographical position of any leaks using the continuous probe measurements, and by including the distance d from the manhole location immediately upstream. Furthermore, the maps are updated to include any quantitative determinations, or estimates, of the magnitudes of the leaks.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DESCRIPTION OF THE PREFERRED EMBODIMENTS

1. BASIC CONCEPTS

Figure 1:
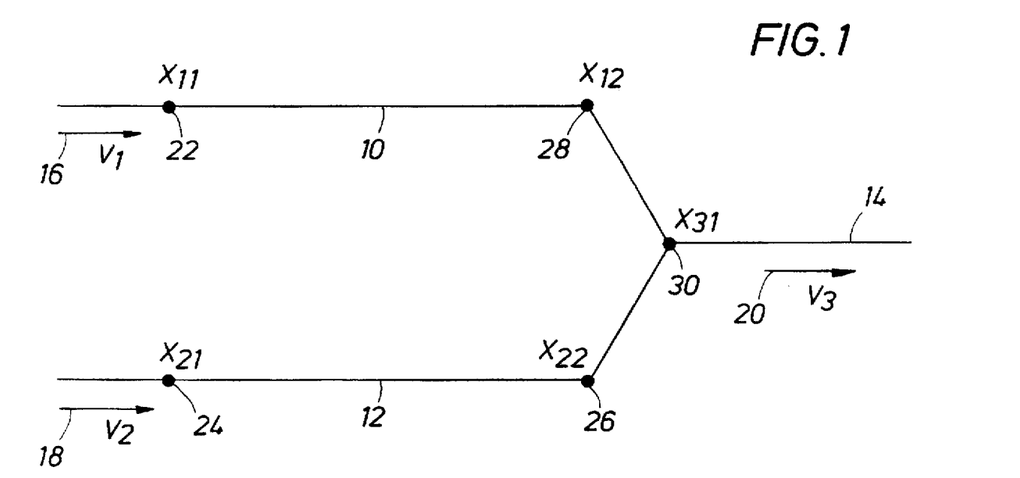
FIG. 1 illustrates conceptually a sewer sub-network in which no leaks are present.

Attention is directed to FIG. 1 which illustrates conceptually a portion or sub-section of a sewer pipeline system. A sewer pipe or "line" 10 is shown with two manhole access posts 22 and 28. A second sewer line 12 is also shown with two manhole access ports 24 and 26. The sewer lines 10 and 12 join at a point which is accessed by the manhole 30 and feed into a third line 14. For purposes of discussion, lines 10, 12, and 14 will be designated as lines i=1, 2, and 3, respectively, using the previously introduced system of subscripts. Still using the subscript identifiers, manholes 22 and 28 will be designated as manholes j=1 and 2, respectively, in line i=1. Manholes 24 and 26 will be designated as manholes j=1 and 2, respectively, in line i=2. Finally, manhole 30 will be designated as manhole j=1 in line i=3. Sewage is flowing within lines i=1, 2, and 3 in a direction shown by the arrows 16, 18, and 20, respectively.

Still referring to FIG. 1, if no leaks are present in any of the sewer lines, then:

$$X_{11}=X_{12} \tag{1}$$

$$X_{21}=X_{22} \tag{2}$$

$$V_3=V_1+V_2 \tag{3}$$

where $X_{i,j}$ are the station fluid property measurements as previously defined, and $V_i$ represent the volume flow rates of sewage in lines i=1, 2, 3.

Figure 2:
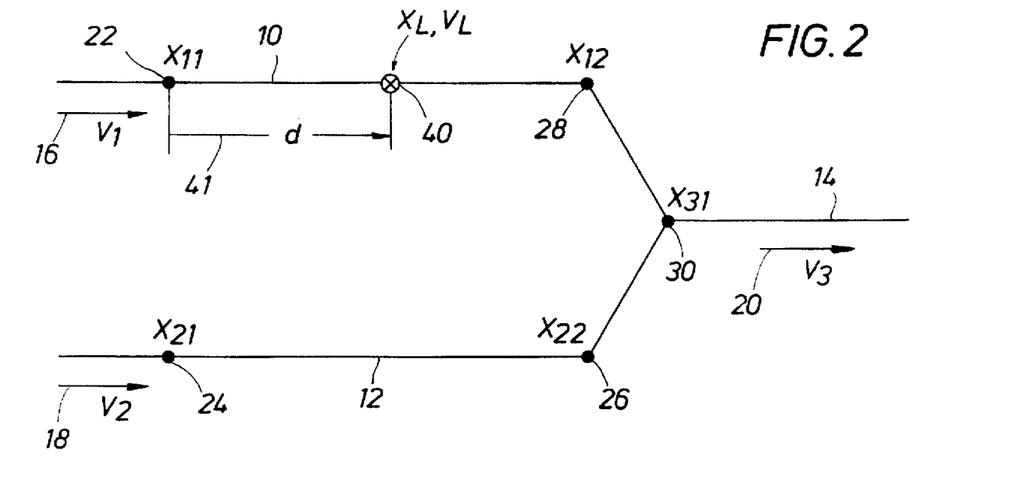
FIG. 2 illustrates the sewer sub-network illustrated in FIG. 1 in which a leak exists.

FIG. 2 shows the same sub-section of sewer system, but with a leak shown in the line i=1 at a location 40. For purposes of illustration, assume that liquid is flowing into the line i=1 through the leak. For this situation:

$$X_{11}=X_{22} \tag{4}$$

$$X_{21}=X_{22} \tag{5}$$

$$V_3=V_1+V_2+V_L \tag{6}$$

where $V_L$ is the volume flow rate of the leak. Since liquid is entering line 1 through the leak at location 40, $X_{11}$ will not equal $X_{12}$ as is stated in equation (4). For purposes of illustration, the liquid property of fluid leaking into line 1 is designated as $X_L$. The reading $X_{12}$ can be expressed as:

$$X_{12}=(X_{11}V_1+X_LV_L)/(V_1+V_2) \quad (7)$$

The reading $X_{31}$ can be expressed as:

$$X_{31}=[X_{12}(V_1+V_L)+X_{22}V_2]/(V_1+V_2+V_L) \quad (8)$$

Equations (7) and (8) can be rearranged to yield:

$$V_L=[V_3(X_{22}-X_{31})-V_1](X_{22}-X_{12}) \quad (9)$$

and $$X_L=[X_{12}(V_1+V_L)-X_{11}V_1]/V_L \quad (10)$$

The flow rate of sewage exiting the pipeline system and entering the treatment facility is usually measured. In the illustrations of FIGS. 1 and 2, this measure would consists of a measure of $V_3$. If, in addition, flow rate $V_1$ were measured upstream from the leak at location 40, equation (9) indicates that $V_L$ can be calculated, since the remaining terms on the right hand side of this equation are measured quantities from the set $X_{i,j}$. Stated another way, if the designated flow rates are measured, the flow rate of the leak, namely $V_L$, can be quantified using equation (9). Furthermore, the value of $V_L$ can be used in equation (1), along with the measured fluid properties, to determine $X_L$ which is the fluid property of the leaking liquid.

As stated previously, it is often not possible to obtain the volume flow rates necessary to quantify the leak. As an alternate, the previously discussed video system is used to obtain an estimate of the magnitude of the leak.

Once the leak is found between sequential manhole locations, and the magnitude of the leak is possibly quantified or possibly estimated, the leak location is pinpointed. This is accomplished by tethering the fluid property probe to one end of a cable, lowering the probe by means of the cable into the manhole which is immediately upstream from the leak, and obtaining continuous fluid property measurements by allowing the probe to float along the sewage stream by deploying the cable from a winch reel. Once a change in fluid property is observed in the immediate vicinity of the leak location 40, the amount of cable deployed from the reel is recorded, and the position of the probe is determined with respect to the location of the manhole through which it was lowered. From the change in continuous fluid property readings and from a reading of deployed cable, the location 40 of the leak, in terms of a distance d denoted by the numeral 41, is determined. The distance d is the distance of the leak location 40 as measured from the location of the manhole i=1 and j=1.

The sewer diagram illustrated in FIGS. 1 and 2 is very simple in order to illustrate the basic concepts of the invention. It should be understood that actual sewer systems are much more complex. The basic concepts discussed above are, however, applicable to more complex systems as will be shown in a subsequent section on results that can be obtained with the methods and apparatus of the invention.

2. APPARATUS

Figure 3:
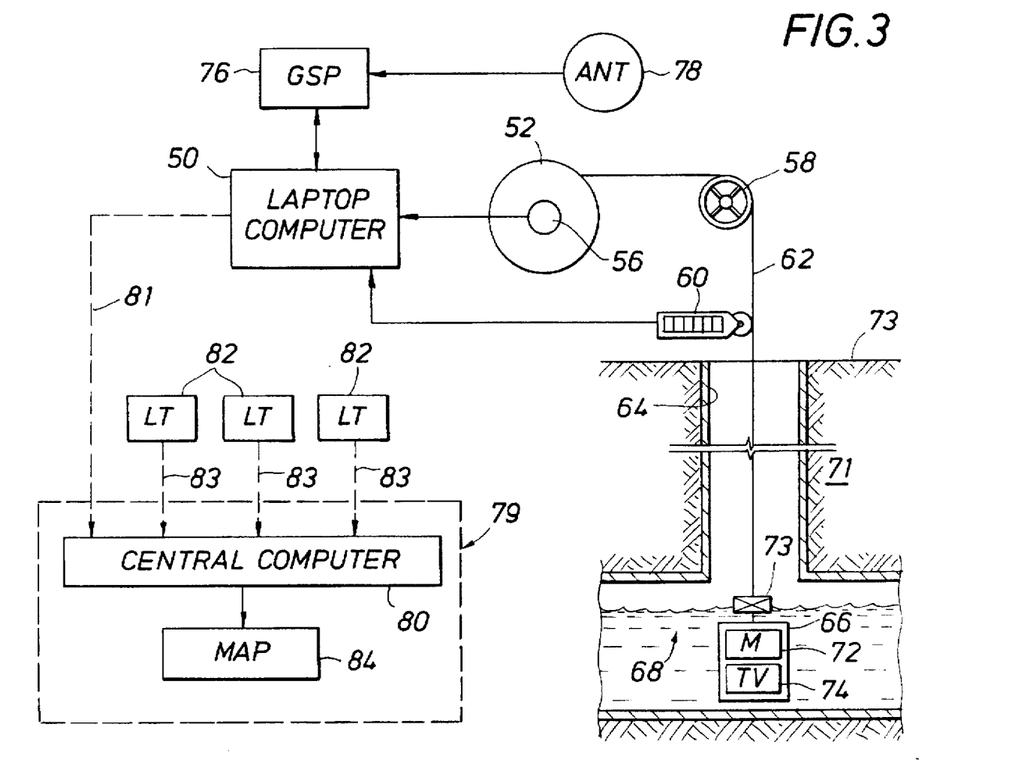
FIG. 3 illustrates the basic apparatus of the present invention.

A functional diagram of the apparatus of the current invention is shown in FIG. 3. Equipment used in the field by a field crew to make the basic fluid properties measurements will first be discussed.

A probe 66 is used to measure basic fluid properties of liquid sewage 68 flowing in a sewer pipe or 'line" 70. The probe 66 contains at least one meter 72 which responds to basic fluid properties such as total dissolved solids (TDS), salinity, conductivity or temperature. Commercially available TDS meters are suitable for this purpose. Furthermore, commercially available salinity meters are also suitable for adaptation within the probe 66. Still further, a commercially available conductivity meters can be used in the probe 66 to measure conductivity of the liquid sewage 68. In addition, commercially available temperature gauge meters can be used within the probe 66 to measure the temperature of the liquid 68 flowing within the sewer pipe 70. The probe 66 can also incorporate an optional television (TV) camera 74 as will be discussed in detail in a subsequent section of this disclosure.

As mentioned previously, the probe 66 can comprise multiple meters to measure multiple fluid property measurements in order to increase the probability of observing at least one fluid property variation resulting from a leak. Using a previous example, the probe 66 could contain both a salinity meter and a colorimeter. As a further example, the probe 66 could contain a salinity meter and a colorimeter and a temperature gauge. For clarity, however, it will be assumed that the probe 66 contains a single meter. It should be understood, however, that the following disclosure is also applicable to multiple fluid property determinations.

The probe is lowered into the sewage stream 68 at fixed or "station" location which is preferably an essentially vertical manhole access holes 64 which penetrate the earth formation 71 allowing access from the earth surface 73 to the essentially horizontal sewer line 70. The probe is preferably attached or "tethered" to one end of a cable 62, with the other end of the cable being attached to a reel 52. The probe is raised and lowered in the manhole 64 by rotating the reel 52 thereby allowing the liquid 68 to be contacted by the probe 66.

Signals from the one or more meters 72 are transmitted over preferably electrical conductors (not shown) within the cable 62, through a slip ring assembly 56, and into a preferably portable computer 50 which preferably is a laptop computer. The station fluid property readings, previously defined as $X_{i,j}$, are recorded within memory of the laptop computer 50.

As mentioned in previous discussion, the geographic location of each fluid property station measure $X_{i,j}$ must be known in order to generate the desired survey maps. This information is obtained automatically by means of a global positioning system 76 (GPS) which communicates with a satellite in geosynchronous orbit by means of an antenna 78. Such GPS systems are well known in the art and are commercially available with all required equipment including an appropriate antenna. When a station measurement Xi,j is made, the location of the survey point is automatically determined by the GPS 76 and recorded, along with the corresponding value $X_{i,j}$, in the memory of the laptop computer 50

Once all required fluid property station measurements $X_{i,j}$, and corresponding geographic locations, are made and recorded in the memory of the laptop computer 50, the field crew returns to preferably a central processing center 79 where data stored in the laptop computer 50 are downloaded, as shown operationally by the broken line 81, into a central computer 80. If additional field crews are also gathering data, these crews download data stored within their field laptop computers 82 into the central computer 80, as shown operationally by the broken lines 83 Data from all crews are then compiled and processed to determined, from the set of data $X_{i,j}$, if any leaks are apparent and, if apparent, the rough location of the leaks. Methodology for determining the location of leak, to within the position of two sequential manhole locations, has been discussed previously in detail. The $X_{i,j}$ data are preferably plotted as a function of geographic location and overlaid on a diagram of the surveyed sewer system thereby forming a map 84. The map display aids in determining the rough location of any leaks. It should be understood, however, that a system survey map is not the only useful form of outputting survey data. Tabulations, statistical analyses and the like also represent useful outputs of analyzed survey data.

Once a leak is roughly located between two sequential manholes, the field crew is returned to the approximate location of the leak with the field apparatus shown in FIG. 3. At this time, the probe 66 is again lowered on the cable 62, which passes over a sheave wheel 58, by reel 52 through a manhole opening 64 which is immediately "upstream" from the roughly located leak. A float 73 suspends the probe 66 within the liquid sewage 68. Additional cable 62 is deployed from the reel 52 thereby permitting the probe 66 and float 73 to drift downstream with the sewage flow. As the probe drifts, the field crew observes the fluid property readings at the earth surface 75, with these readings being telemetered over conductors within the cable 62. The amount of cable deployed from the reel 52 is tracked by a cable deployment device 60 which is well known in the well logging art. The output of the cable deployment device is input to the laptop computer 50. Once a significant change in the measured fluid property is observed, the field crew preferably indicates this event to the laptop computer 50. Amount of cable deployed at the time of the significant fluid property change is record by the computer 50.

The field crew again returns to the central data processing location 79 where, again, the data stored in the memory of the laptop computer 50 are downloaded into the central computer 80. The recorded amount of deployed cable at the time of observed significant change in fluid property is then used to compute the exact or pinpoint location of the leak. The relative location of the leak with respect to the known upstream manhole location has been defined as the quantity d, as denoted by the numeral 41 in FIG. 2. The map 84 is updated at this time to include the pinpoint or high resolution location of the detected leak.

Still referring to FIG. 3, the previously discussed methodology and criteria for pinpoint leak location can alternately be programmed in the computer 50, and the significant change in continuous fluid property measurements, recorded by the floating probe in the immediate vicinity of the leak, can be automatically determined. This relieves the field crew from having to observe the continuous fluid properties measurements transmitted by the floating probe. As a further alternate in the methodology, the pinpoint leak location can be made at the time the original station $X_{i,j}$ data are measured, in the event that the field crew observes a significant change in the $X_{i,j}$ data between sequential manhole locations (i.e. $X_{i,n+1}$ differs from $X_{i,n}$). It is, however, preferred that the $X_{i,j}$ station data from all crews be analyzed by expert personnel at the central data processing facility 79 prior to any pinpointing of specific leaks.

In an earlier section, the quantification, or at least the estimation, of the volume flow rate of a leak was discussed. If the required volume flow rate measurements are available, quantitative volume flow of the leak is computed preferably within the central computer 80 and annotated on the map 84. If an estimate of the volume flow rate is made from data supplied by the TV system 74, this-value is determined preferably using the central computer 80 and is likewise annotated on the map 84.

3. RESULTS

The sewer system survey results that can be obtained with the current invention will be illustrated by means of a series of examples. In these examples, all readings of fluid properties $X_{i,j}$ and $X_L$ are in arbitrary units, as are any values of volume flow rates $V_i$ or $V_L$.

Figure 4A:
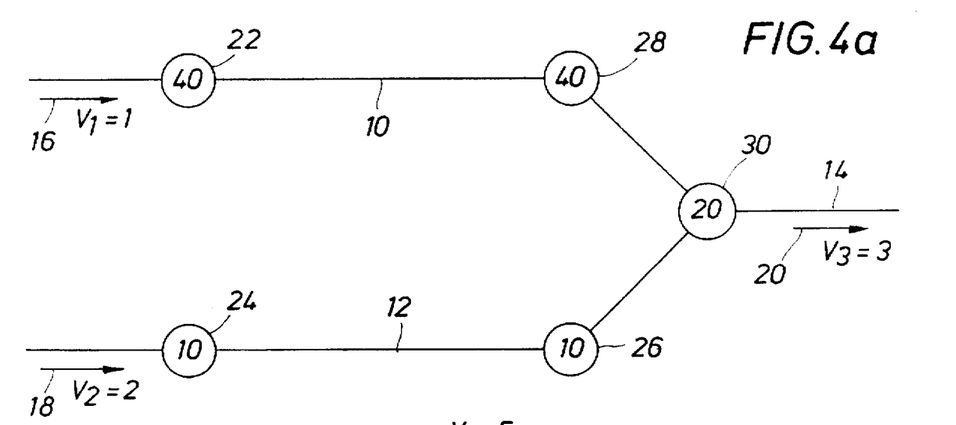
FIG. 4a illustrates a station map of a survey in which no leaks are indicated.

FIG. 4a illustrates the same sewer line sub-network illustrated previously in FIGS. 1 and 2, where no leaks are present. Equations (1) through (3) mathematically describe this situation. For purposes of illustrating a station data map, assume that:

$$X_{11}=X_{22}=40;$$

$$X_{21}=X_{22}=10;$$

$$V1=1;$$

$$V2=2;$$

and $$V_3=V_1+V_2$$

A suitable map format for the station data is shown in FIG. 4a, where the values of $X_{i,j}$ are annotated at the corresponding manhole locations, and quantitative or estimates of volume flow rates, if available, are annotated at the flow direction indicators 16, 18 and 14 for the appropriate sewer lines i=1, 2, and 3, respectively. No leaks are indicated on the initial station map of FIG. 4a, therefore no additional data acquisition or processing is required.

Figure 4B:
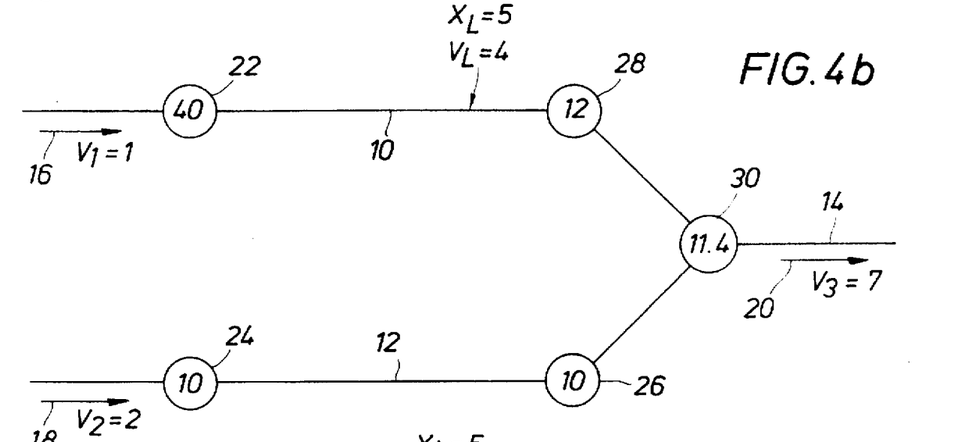
FIG. 4b illustrates a station map of a survey in which a leak is indicated.

Attention is next directed to FIG. 4b which again illustrates the same sewer line sub-network of FIG. 4a. Again, $$X_{11}=40;$$

$$X_{21}=X_{22}=10;$$

$$X_{12}=12;$$

$$V_1=1;$$

and $$V_2=2$$

In this example, however, $X_{11} \neq X_{12}$ indicating a leak in line i=1 between manhole locations 22 and 28. Equations (4), (5) and (6) mathematically describe this situation. If volume flow rate data $V_3$ and $V_1$ are available, the volume flow rate of the leak, $V_L$, and the fluid property of the leaking fluid, $X_L$, can be computed using equations (7) through (11), and the station map can be annotated with these quantities are shown in FIG. 4b. In this example, if $V_3$ is in some way measured to be 7 and $V_1$ is in some way measured to again be 1, and $X_{3,1}$ is measured to be 11.4, then $X_L$ is computed to be 5 and $V_L$ is computed to be 4.

Figure 4C:
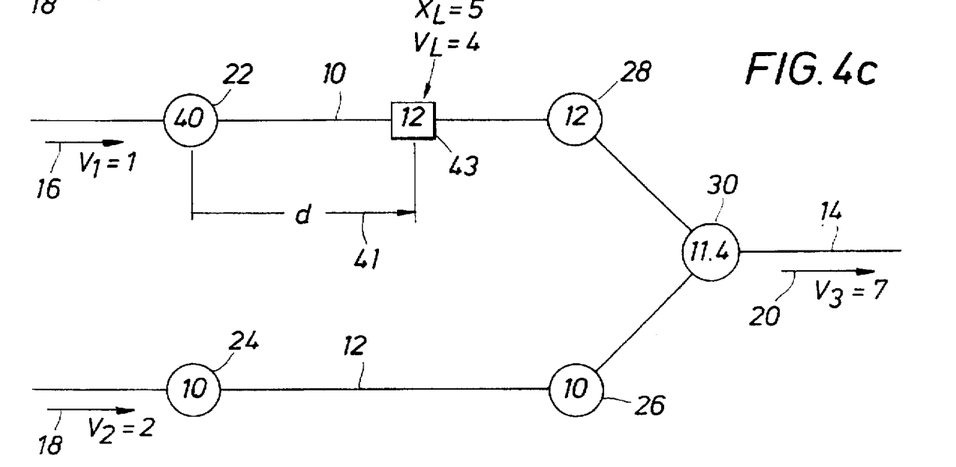
FIG. 4c illustrates an updated map of the survey shown in FIG. 4b, wherein the pinpoint location of the leak is shown.

Since the station map FIG. 4b clearly shows a leak between manhole 22 and manhole 28, the field crew is returned to this location with the field equipment shown in FIG. 3. Referring to FIG. 3 and FIGS. 4b and 4c, the probe 66 is lowered within manhole 22 and allowed to float in the flowing sewage 68 toward manhole 28. As the probe approaches the actual location 43 of the leak, a significant change in fluid property measurement is observed. The length of cable 62 deployed from the reel 52 is recorded and the pinpoint location 43 of the leak is determined by computing the dimension d as denoted by the numeral 41. The station map as shown in FIG. 4b is then updated with the pinpoint location of the leak, and suitably annotated with the composite fluid property value 12, yielding the final map property as shown in FIG. 4c.

Figure 5:
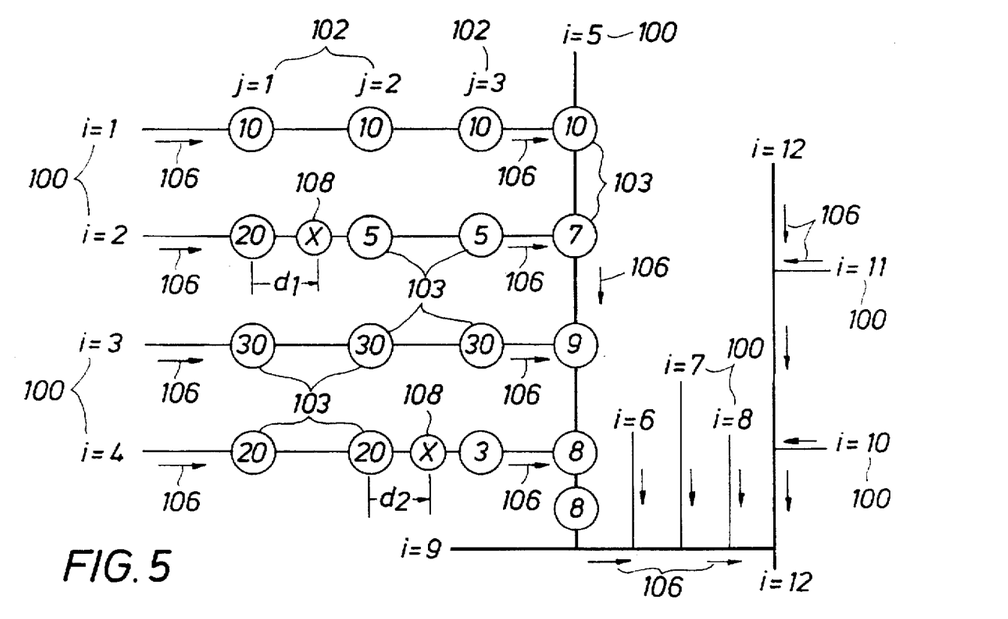
FIG. 5 illustrates a survey map of a relatively complex sewer network.

As mentioned in numerous sections of this disclosure, the sewer sub-network map shown in FIGS. 3 and 4a, 4b, and 4c are greatly simplified for purposes of illustrating basic concepts of the present invention. A more complex network is shown in FIG. 5 to again illustrate the terminology used in this disclosure, and to further illustrate the form of a survey map. FIG. 5 shows a total i=12 sewage lines denoted as a group by the numeral 100. Relatively small lines (i=1, .... 4) flow into a larger line (i=5) which flows into a larger line (i=9) which flows into a still larger line (i=12). Station survey points, preferably manhole locations, are indexed with the subscript j and denoted as a group by the numeral 102. Station fluid property measurements $X_{i,j}$ are annotated at the geographical locations 103 of the station measure points and are identified as a group by the numeral 104. Fluid flow directions are denoted as a group by the arrows 106 and optionally can be annotated with volume flow rate data if available. The pinpoint locations of leaks are denoted by the numeral 108, and are determined as a function of the previously defined dimensions d.

The use of the term "continuous" measurements in the above disclosure is further defined to include "essentially continuous" measurements. It is preferable to make literally continuous fluid property measurements as the probe floats between two fixed station locations. This may cause problems if the data telemetry system between the probe and the laptop computer is limited, or if data storage capacity in the laptop computer is limited, or if the response of the fluid property meter is statistically limited, or for other operational reasons. The apparatus and methods of the invention also apply to essentially continuous measurements, wherein a fluid property measurement is made at predetermined time intervals or at predetermined intervals of cable deployment. Such essentially continuous measurements can, however, degrade the resolution to which a leak can be located. If, as an example, the inherent resolution of a salinity meter is ±one foot, but "essentially continuous" TDS measurements are collected at predetermined cable deployment intervals of three feet, it is obvious that incremental measurements yield a resolution of only ±three feet, even though true continuous measurements could resolve leak locations to ±one foot.

It is emphasized that the apparatus and methods of the invention can be applied to any pipeline or pipeline system. As an example, the pipe or pipeline does not have to be buried within the earth, but could positioned of the sea floor. If the pipeline system has station access ports and transports, as an example, crude oil, the present invention can be used to detect infiltration of sea water by measuring the salinity or the conductivity or the temperature of the liquid within the pipeline system.

DOPANT TRACING

While expensive but precise radioactive dopant tracing can be used, less costly and convenient dopant tracing can be obtained by injecting a known concentration of a dopant and measuring dopant dilution downstream. Two types are desirable and they are dyes and salts. In a water solution, dye or salt is mixed and delivered at a controlled rate into a sewer line. An acceptable inorganic salt is common table salt at a concentration approaching saturation. The salt concentration is measured at several locations downstream by well known instruments. The salt concentration is a factor used in determining ground water entry into the system. The probe is responsive to concentration measurement.

The invention is directed toward, but not limited to, the measure of liquid flowing from, or into, a pipeline system in which liquid is flowing. As an example, the infiltration of gas, under pressure, into a pipeline flowing liquid will vary the temperature of the composite fluid downstream from the leak. Likewise, the infiltration of liquid into a pipeline containing gas will vary the temperature and possibly the conductivity of the composite fluid downstream from the leak.

While the foregoing disclosure is directed toward preferred embodiments, the scope of the invention is set forth by the claims which follow.

What is claimed is:

1. A method for determining a leak in a pipeline in which fluid flows, comprising the steps of:
   (a) providing a surface unit comprising a cable reel and a cable wound there upon;
   (b) providing a probe having a meter;
   (c) positioning, by operation of said surface unit, said probe within said fluid at a plurality of stations along said pipeline;
   (d) obtaining a fluid property measurement at each said station;
   (e) roughly determining the location of said leak by combining
      (i) observed change in station fluid property measurements for two adjacent stations, and
      (ii) determined geographical locations of said adjacent stations; and
   (f) precisely determining the location of said leak using said roughly determined location and by measuring changes in the same fluid property.

2. The method of claim 1 wherein said geographical locations of said adjacent stations are determined by a global positioning system.

3. The method of claim 1 wherein said fluid property comprises the salinity of said fluid.

4. The method of claim 1 wherein said fluid property comprises the total dissolved solids within said fluid.

5. The method of claim 1 wherein said fluid property measurement comprises the temperature of the fluid.

6. A system for locating leaks within a pipeline in which fluid flows, comprising:
   (a) a meter for measuring at least one property of said fluid;
   (b) conveyance means comprising a surface unit for conveying said meter by floatation within said fluid flow within said pipeline;
   (c) a position system to determine the location of said meter within said pipeline with respect to the location of a measure station; and
   (d) a computer which is used to combine at least one variation in said at least one measured property at least one property of said fluid and said location of said probe to at the time at which said at least variation occurs and said location of said measure station to determine the location of said leak.

7. The system of claim 6 wherein said meter is contained within a probe and wherein said conveyance means comprises:
   (a) a float attached to said probe for suspending said probe within said flowing fluid;
   (b) a cable reel cooperatively connected to said surface unit; and
   (c) a cable, wherein a first end is attached to said probe and a second end is attached to said cable reel, and wherein said probe is positioned within said flowing fluid by deploying cable from said cable reel, and wherein said probe is conveyed along said pipeline in the direction of fluid flow by suspending from said float within said fluid and by deploying additional cable.

8. The system of claim 7 wherein said position system further comprises a cable deployment device which measures the amount of cable deployed from said cable reel.

9. The system of claim 6 further comprising a global positioning system which cooperates with a satellite, wherein said global positioning system is used to determine the geographical locations of said measure stations.

10. The system of claim 6 further comprising a television camera, wherein:
   (a) said television camera is used to obtain a video picture of a located leak; and
   (b) the volume flow rate of said located leak is estimated from said video picture.

11. A system for measuring leaks within a sewage pipeline system in which sewage flows, comprising:
   (a) A plurality of probes;
   (b) at least one meter mounted within each of said probes, wherein said at least one meter is used to measure at least one property of said sewage;
   (c) conveyance means comprising a surface unit for conveying each said probe within said pipeline by floatation in said sewage flows;
   (d) a position system to determine the geographical location of each said probe within said pipeline; and
   (e) a plurality of portable computers wherein each portable computer cooperates with a specific probe, and wherein each said portable computer is used to combine
      (i) observed variations in said measured at least one property of said sewage measured by each said probe, and
      (ii) said geographical location of each said probe at the time each said variation is observed, to determine the location of leaks within said sewage pipeline.

12. The system of claim 11 wherein each said conveyance system comprises:
   (a) a float attached to each said probe for suspending said probe within said flowing sewage;
   (b) a cable reel which is positioned at a measure station which is an upstream measure station of two measure stations between which said leak has been located; and
   (c) a cable, wherein a first end is attached to said probe and a second end is attached to said cable reel, and wherein said probe is positioned within said flowing fluid by deploying cable from said cable reel, and wherein said probe is conveyed along said sewage pipeline in the direction of sewage flow by suspending from said float within said sewage and by deploying additional cable.

13. The system of claim 12 wherein said position system comprises:
   (a) a cable deployment device which measures the amount of cable deployed from each said cable reel and which is used to determine the location of each probe with respect to said measure station at which said cable reel is positioned; and
   (b) a global positioning system to determine the geographical location of each said measure station.

14. The system of claim 11 further comprising a plurality of television cameras, wherein:

(a) a single television camera is mounted within each said probe and obtains a video picture of a located leak; and
(b) the volume flow rate of said located leak is determined from said video picture.

15. The system of claim 11 further comprising a central computer wherein information stored in said plurality of portable computers are downloaded into said central computer, and wherein said downloaded information generates a leak survey map.

16. A method for locating a leak in a pipe, comprising the steps of:
   (a) measuring a property of fluid within said pipe at least two fixed locations with a fluid property sensor thereby generating station measurements;
   (b) measuring, with said fluid property sensor, said fluid property essentially continuously as a function of determined relative position between two adjacent said fixed locations thereby generating continuous measurements; and
   (c) combining geographical location of at least one of two station measurements, and an observed change in said continuous measurements, and a determined relative position at the time of observation of said change to obtain said leak location.

17. A system for locating a leak in a pipe, comprising:
   (a) a probe for measuring a property of fluid within said pipe at least two fixed locations thereby generating at least two station measurements;
   (b) means for conveying said probe between the locations of two adjacent station measurements thereby permitting essentially continuous measurements of said fluid property and thereby generating continuous measurements;
   (c) means for determining changes in said continuous measurements;
   (d) means for determining the relative location of said probe with respect to at least one said fixed location;
   (e) means for determining the geographical location of at least one said fixed location; and
   (f) a computer wherein said station measurements, and said changes in continuous measurements, and said determined relative location of said probe, and said at least one geographical location of at least one said fixed location, are combined to obtain an absolute location of said leak.

18. A method for determining a leak in a pipeline in which fluid flows, comprising the steps of:
   (a) providing a surface unit comprising a cable reel and a cable wound there upon;
   (b) providing a probe having a meter;
   (c) positioning, by operation of said surface unit, said probe within said fluid at a plurality of stations along said pipeline;
   (d) obtaining a fluid property measurement at each said station;
   (e) roughly determining the location of said leak by combining
      (i) observed change in station fluid property measurements for two adjacent stations, and
      (ii) determined geographical locations of said adjacent stations; and
   (f) precisely determining the location of said leak using said roughly determined location by
      (i) placing said probe within said fluid at the upstream station of said two adjacent stations, (ii) conveying said probe within said fluid in the direction of the fluid flow by floating said probe within said fluid flow, (iii) obtaining a continuous fluid property measurement, and (iv) determining said precise location of said leak by combining said geographical location of said upstream station, observed change in said continuous fluid property measurement, and a determined location of said probe at the time of said observed change in said continuous fluid property measurement.

19. The method of claim 18 wherein said probe is positioned within said fluid on said cable connected to said cable reel, wherein a first end of said cable is attached to said probe and a second end of said cable is attached to said cable reel wherein said cable reel moves said cable to position said probe within said fluid flow.

20. The method of claim 19 wherein said probe is conveyed within said fluid in the direction of the fluid flow by:

(a) providing a float;

(b) attaching said float to said probe such that said probe is suspended within said flowing fluid; and (c) deploying cable from said cable reel thereby allowing said float and said probe attached thereto to be conveyed by said flowing fluid.

21. The method of claim 20 wherein said location of said probe at the time of said observed change in said continuous fluid property measurement is determined by combining:

(a) a measure of cable deployed from said cable reel at the time at which said change in continuous fluid property measurement is determined; and (b) said geographical location of said upstream station.

22. The method of claim 18 wherein said observed change in station fluid property measurements for two adjacent stations and said determined geographical locations of said adjacent stations are temporarily stored in a portable computer.

23. The method of claim 22 wherein said precise location of said leak is determined with temporarily stored data in the portable computer.

24. The method of claim 22 wherein a plurality of fluid property measurement changes and geographical locations of corresponding two adjacent stations are sequentially downloaded into a central computer, and a leak survey map is generated therefrom.

25. The method of claim 18 wherein said pipeline comprises sewer lines, said flowing fluid comprises sewage, and said stations comprise manholes, and said method steps are determined with respect to sewage flow in said sewer lines.

26. The method of claim 18 wherein said probe comprises a plurality of meters and wherein each meter is responsive to a different fluid property, and wherein said probe is placed within said fluid at the upstream station of said adjacent stations, and wherein a plurality of continuous fluid property measurements are made, and wherein said precise location of said leak is determined by combining:

(a) said location of said upstream station;

(b) observed changes in said plurality of continuous fluid property measurements; and (c) a determined location of said probe, relative to said upstream station, at the time of said observed changes in said continuous fluid property measurements.

27. The method of claim 18 wherein said probe contains a television camera, and wherein a picture of said located leak is obtained with said television camera, and wherein the volume flow rate of said located leak is estimated using said picture.

28. A method for determining the location of a leak through which a first fluid leaks into a pipeline in which a second fluid is flowing, comprising the steps of:

(a) inserting upstream from said leak a dopant into said second liquid;

(b) providing a probe which cooperates with a surface unit;

(c) providing a meter which responds to the concentration of said dopant and which is contained within said probe;

(d) positioning by operation of said surface unit said probe within said second fluid at a plurality of stations along said pipeline;

(e) obtaining a dopant concentration measurement at each said station;

(f) roughly determining the location of said leak by combining (i) an observed decrease in station dopant concentration measurements for two adjacent stations, (ii) determined geographical locations of said adjacent stations; and (g) using said roughly determined leak location in the definition of a precise leak location by (i) placing said probe within said second fluid at the upstream station of said two adjacent stations, (ii) conveying said probe within said second fluid by floating in the direction of the flow of said second fluid.

(iii) obtaining a continuous measure of dopant concentration, (iv) determining a precise location of said leak by combining said location of said upstream station, an observed decrease in said continuous dopant concentration measurement, and a determined location of said probe, relative to said upstream station, at the time of said observed change in said continuous dopant concentration measurement.

* * * * *